United States Patent
Ishikawa et al.

(10) Patent No.: US 12,544,928 B2
(45) Date of Patent: Feb. 10, 2026

(54) INTERFERENCE DETERMINATION DEVICE AND PATH GENERATION DEVICE

(71) Applicant: DENSO CORPORATION, Kariya (JP)

(72) Inventors: Shota Ishikawa, Kariya (JP); Tomoaki Ozaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 161 days.

(21) Appl. No.: 18/481,131

(22) Filed: Oct. 4, 2023

(65) Prior Publication Data

US 2024/0116180 A1   Apr. 11, 2024

(30) Foreign Application Priority Data

Oct. 6, 2022   (JP) .................................. 2022-161870

(51) Int. Cl.
*B25J 9/16*   (2006.01)

(52) U.S. Cl.
CPC ........... *B25J 9/1666* (2013.01); *B25J 9/1676* (2013.01); *B25J 9/1679* (2013.01); *G05B 2219/39091* (2013.01)

(58) Field of Classification Search
CPC ...... B25J 9/1666; B25J 9/1676; B25J 9/1679; G05B 2219/39091
See application file for complete search history.

(56) References Cited

U.S. PATENT DOCUMENTS

| | | | |
|---|---|---|---|
| 11,697,412 B2 * | 7/2023 | Crego .................. | B60W 30/09 701/301 |
| 2009/0326713 A1 * | 12/2009 | Moriya ................. | B25J 9/1676 701/25 |
| 2017/0097232 A1 * | 4/2017 | Anderson-Sprecher .................... B25J 5/007 |
| 2021/0260763 A1 | 8/2021 | Tonogai et al. | |
| 2024/0017413 A1 * | 1/2024 | Sugaya ................. | B25J 9/1664 |
| 2024/0058961 A1 * | 2/2024 | Matsuda ............... | B25J 9/1666 |

FOREIGN PATENT DOCUMENTS

| | | |
|---|---|---|
| JP | 2002-086383 A | 3/2002 |
| JP | 2021-065939 A | 4/2021 |

* cited by examiner

*Primary Examiner* — Abby Lin
*Assistant Examiner* — Karston G. Evans
(74) *Attorney, Agent, or Firm* — Maschoff Brennan

(57) ABSTRACT

An interference determination device includes a registration unit that registers a start point and an end point of a motion of a robot, an interference determination unit that determines whether the robot interferes with an obstacle when the robot moves along a path from the start point to the end point, and an interference determination condition registration unit that registers an interference determination condition including at least one of an interference allowable distance that allows the interference with the obstacle, a positional error that is included in a relative position between the robot and the obstacle when the relative position is grasped, and a synchronization time error when the obstacle is a movable object that moves along a predetermined path in synchronization with the motion of the robot. The interference determination unit determines whether the robot interferes with the obstacle in consideration of the interference determination condition.

14 Claims, 10 Drawing Sheets

INTERFERENCE DETERMINATION DEVICE AND PATH GENERATION DEVICE

CROSS REFERENCE TO RELATED APPLICATION

The present application claims the benefit of priority from Japanese Patent Application No. 2022-161870 filed on Oct. 6, 2022. The entire disclosures of the above application are incorporated herein by reference.

TECHNICAL FIELD

The present disclosure relates to an interference determination device that determines whether a motion of a robot interferes with an obstacle, and a path generation device that includes the interference determination device.

BACKGROUND

For example, it has been known a path generation device that allows a user to input a clearance amount for at least one of each joint of a robot and an obstacle via an input unit. For example, when the clearance amount is set for the joint, it means that a thickness increases by the clearance amount in a normal direction to a surface of the joint. Such a path generation device generates a path for the robot that secures an interval corresponding to at least the clearance amount between the robot and an obstacle.

SUMMARY

The present disclosure describes an interference determination device that determines presence or absence of interference with an obstacle in consideration of characteristics of the obstacle and various error factors, and a path generation device including the interference determination device. According to an aspect, an interference determination device registers a start point and an end point of a motion of a robot, registers an interference determination condition for determining an interference between the robot and an obstacle, and determines whether the robot interferes with the obstacle, when the robot moves along a path from the start point to the end point, in consideration of the registered interference determination condition. The interference determination condition includes at least one of an interference allowable distance that allows the interference with the obstacle, a positional error that is included in a relative position between the robot and the obstacle when the relative position is grasped, and a synchronization time error when the obstacle is a movable object that moves along a predetermined path in synchronization with the motion of the robot.

BRIEF DESCRIPTION OF THE DRAWINGS

Objects, features and advantages of the present disclosure will become more apparent from the following detailed description made with reference to the accompanying drawings, in which.

DETAILED DESCRIPTION

Figure 1:
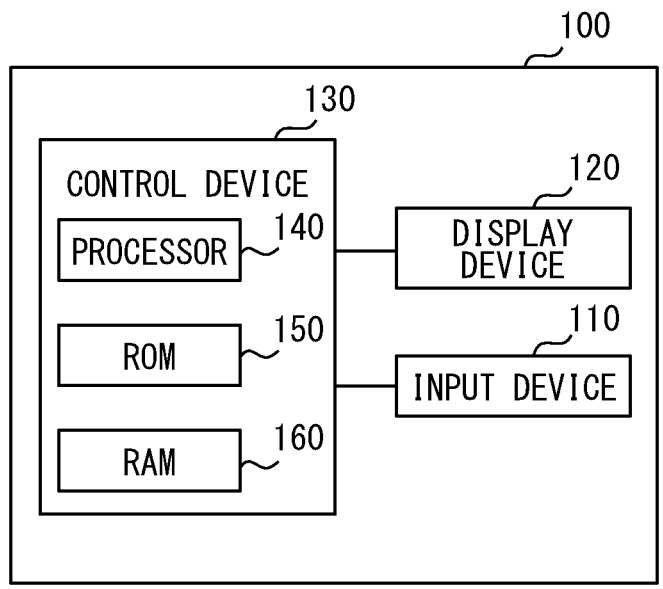
FIG. 1 is a configuration diagram illustrating a configuration of an interference determination device according to a first embodiment.

To begin with, a relevant technology will be described only for understanding the embodiments of the present disclosure.

There is a path generation device that allows a user to input a clearance amount for at least one of each joint of a robot and an obstacle via an input unit. For example, when the clearance amount is set for the joint, it means that a thickness increases by the clearance amount in a normal direction to a surface of the joint. The path generation device generates a path for the robot that secures an interval corresponding to at least the clearance amount between the robot and an obstacle.

However, such a path generation device only considers setting the clearance amount for at least one of each joint of the robot and the obstacle. For this reason, for example, when the obstacle is flexible, it is not possible to set a path for the robot that allows some interference with the obstacle. In addition, since it depends only on the clearance amount, there is a concern that it is not always guaranteed not to interfere with the obstacle due to the influence of errors caused by various factors.

The present disclosure provides an interference determination device which is capable of more appropriately determining presence or absence of interference with an obstacle in consideration of characteristics of the obstacle and various error factors, and a path generation device including the interference determination device.

According to an aspect of the present disclosure, an interference determination device is configured to determine whether a motion of a robot interferes with an obstacle, and includes a registration unit, an interference determination unit and an interference determination condition registration unit. The registration unit is configured to register a start point and an end point of the motion of the robot. The interference determination unit is configured to determine whether the robot interferes with the obstacle, when the robot moves along a path from the start point to the end point. The interference determination condition registration unit is configured to register an interference determination condition when determining the interference between the robot and the obstacle in the interference determination unit. The interference determination condition registration unit is configured to register, as the interference determination condition, at least one of an interference allowable distance that allows an interference with the obstacle, a positional error that is included in a relative position between the robot and the obstacle when the relative position is grasped, and a synchronization time error when the obstacle is a movable object that moves along a predetermined path in synchronization with the motion of the robot. The interference determination unit is configured to determine the interference between the robot and the obstacle in consideration of the interference determination condition registered in the interference determination condition registration unit.

With the interference determination device according to the aspect described above, it is possible to register at least one of the interference allowable distance that allows the interference with the obstacle, the positional error that is included in the relative position between the robot and the obstacle when the relative position is grasped, and the synchronization time error when the obstacle is a movable object that moves along the predetermined path in synchronization with the motion of the robot in the interference determination condition registration unit as the interference determination condition. The interference determination unit determines the interference between the robot and the obstacle in consideration of the interference determination condition registered in the interference determination condition registration unit. Therefore, it is possible to more appropriately determine whether the presence or absence of the interference with the obstacle in consideration of the characteristics of the obstacle and various error factors.

According to an aspect of the present disclosure, a path generation device includes the interference determination device described above and a path generation unit. The path generation unit is configured to generate a path along which the robot is capable of moving without interfering with the obstacle, based on an interference determination result by the interference determination device.

With the path generation device according to the aspect described above, since the above interference determination device is included, it is possible to generate a path along which the robot is capable of moving without interfering with the obstacle after appropriate consideration of interference with the obstacle.

First Embodiment

Hereinafter, an interference determination device according to a first embodiment of the present disclosure will be explained below based on the drawings. FIG. 1 is a configuration diagram illustrating a configuration of an interference determination device 100 according to the first embodiment. The interference determination device 100 is, for example, a device that determines whether a robot 10 illustrated in FIG. 2 interferes with an obstacle when the robot 10 moves along a motion path. The motion path of the robot 10 means a path along which the robot 10 moves as a posture of the robot 10 changes over time.

Figure 2:
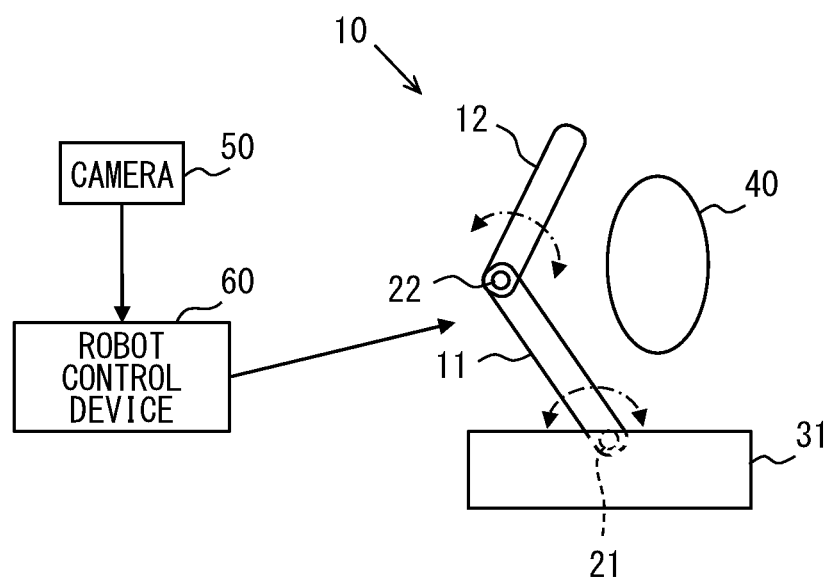
FIG. 2 is a diagram explaining an example of a robot that is a target for generating a motion path.

The robot 10 illustrated in FIG. 2 has two shafts of a first shaft 11 and a second shaft 12, and two joints of a first joint 21 and a second joint 22. However, the configuration of the robot 10 is simplified for explaining the present embodiment. Each of the number of shafts and the number of joints of the robot 10 may be three or more. In addition, the robot 10 may include a portion that moves linearly.

The first joint 21 is provided at one end of the first shaft 11 and makes the first shaft 11 rotatable around a rotation axis that is orthogonal to the first shaft 11. The first shaft 11 is connected to a base 31 by the first joint 21 so as to be relatively rotatable with respect to the base 31. The base 31 is installed, for example, on a floor or an installation stand.

The second joint 22 is provided at the other end of the first shaft 11 opposite to the one end where the first joint 21 is provided. The second joint 22 connects the other end of the first shaft 11 and one end of the second shaft 12. The second joint 22 enables relative rotation of the second shaft 12 with respect to the first shaft 11 around a rotation axis that is orthogonal to the first shaft 11 and the second shaft 12. In FIG. 2, the shapes of the first shaft 11 and the second shaft 12 are rod-shaped. However, the shapes of the first shaft 11 and the second shaft 12 need not be rod-shaped, and can be variously changed according to the application of the robot 10. It is possible to set the angle range in which the first shaft 11 is capable of rotating relative to the base 31 and the range in which the second shaft 12 is capable of rotating relative to the first shaft 11 variously by a mechanical mechanism or an electrical mechanism.

In FIG. 2, an obstacle 40 is also illustrated. The obstacle 40 is an object that may be an obstacle when the first shaft 11 or the second shaft 12 moves. The obstacle 40 is, for example, a work target object of the robot 10, a fixed stationary object around the robot 10, or the like. The shape, the position, the material of the obstacle 40 differ depending on the position where the robot 10 is installed and the application of the robot 10. For example, when robots 10 are arranged close to each other and the robots 10 work together to perform the predetermined work, one robot 10 may become the obstacle 40 with respect to other robots 10. The obstacle 40 may be a movable object that moves along a predetermined path in synchronization with the motion of the robot 10.

The posture of the robot 10 is controlled by a robot control device 60, as illustrated in FIG. 2. The robot control device 60 is composed of a known computer that includes a processor executing various types of calculation processing, and a ROM, a RAM, and the like as storage devices. An image signal from a camera 50 for imaging the robot 10 and the obstacle 40 is input to the robot control device 60 in order to grasp the posture of the robot 10 and the position of the obstacle 40. In the storage device such as a ROM, a motion path determined by the interference determination device 100 as non-interference with the obstacle 40 is stored. The robot control device 60 changes the posture of the robot 10 over time so as to follow the stored motion path, based on the posture of the robot 10 and the position of the obstacle 40 extracted from the image signal of the camera 50. The interference determination device 100 can also serve as the robot control device 60, and the interference determination device 100 and the robot control device 60 may be provided separately.

Referring to FIG. 1 again, the interference determination device 100 includes an input device 110, a display device 120, and a control device 130. The control device 130 includes a processor 140, a ROM 150, a RAM 160, and the like. The interference determination device 100 with such a configuration can be implemented by a known computer.

The input device 110 may be, for example, a known input device such as a keyboard. A user can input, for example, a start point and an end point of the robot 10 via the input device 110. The input start point and end point are registered in the interference determination device 100. When the robot 10 changes the posture along the motion path from the start point to the end point, that is, when the robot 10 moves along the motion path from the start point to the end point, the user can input an interference determination condition for the interference determination device 100 determining the presence or absence of interference between the robot 10 and the obstacle 40. The input interference determination condition is registered in the interference determination device 100. The interference determination condition includes at least one of an interference allowable distance that allows interference with the obstacle 40, a positional error that may be included in the relative position when the relative position between the robot 10 and the obstacle 40 is grasped, and a synchronization time error when the obstacle 40 is a movable object that moves along a predetermined path in synchronization with the motion of the robot 10. The positional error and the synchronization time error can be determined by the robot control device 60 or the like and registered in the interference determination device 100.

The display device 120 can display, for example, a determination result of the interference determination device 100 regarding whether the motion path of the robot 10 interferes with the obstacle 40.

Hereinafter, in the first embodiment, a case in which the interference allowable distance that allows interference with the obstacle 40 is registered in the interference determination device 100 as the interference determination condition will be explained. A case where other interference determination conditions are registered will be explained in a second embodiment and subsequent embodiments.

Figure 3:
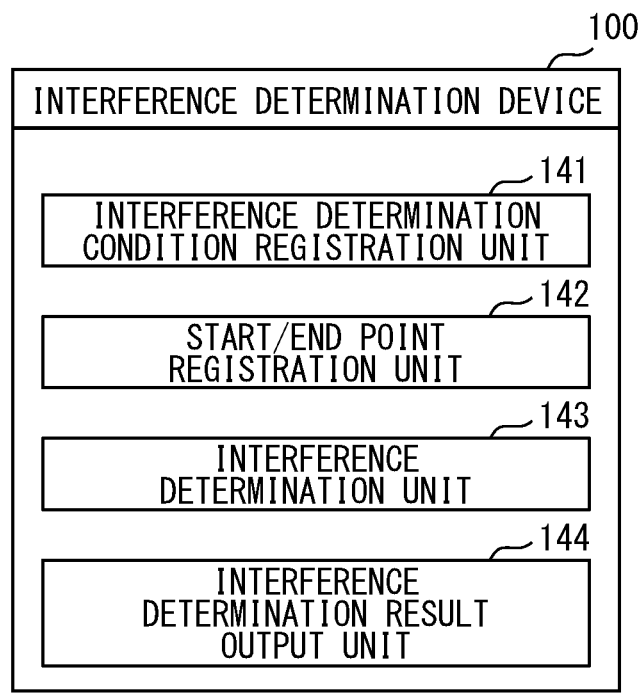
FIG. 3 is a block diagram illustrating functions executed by a processor of FIG. 1.

The ROM 150, which is a non-volatile storage medium, stores an interference determination program executed by the processor 140. The processor 140 executes the interference determination program stored in the ROM 150 while using the temporary storage function of the RAM 160, so that the processor 140 executes various functions illustrated in FIG. 3. In FIG. 3, various functions executed by the processor 140 are illustrated as blocks. The execution of the various functions illustrated in FIG. 3 by the processor 140 means the execution of an interference determination method corresponding to the interference determination program.

As illustrated in FIG. 3, the processor 140 includes an interference determination condition registration unit 141, a start/end point registration unit 142, an interference determination unit 143, and an interference determination result output unit 144. Processing corresponding to the functions of each unit will be explained using the flowchart illustrated in FIG. 4.

Figure 4:
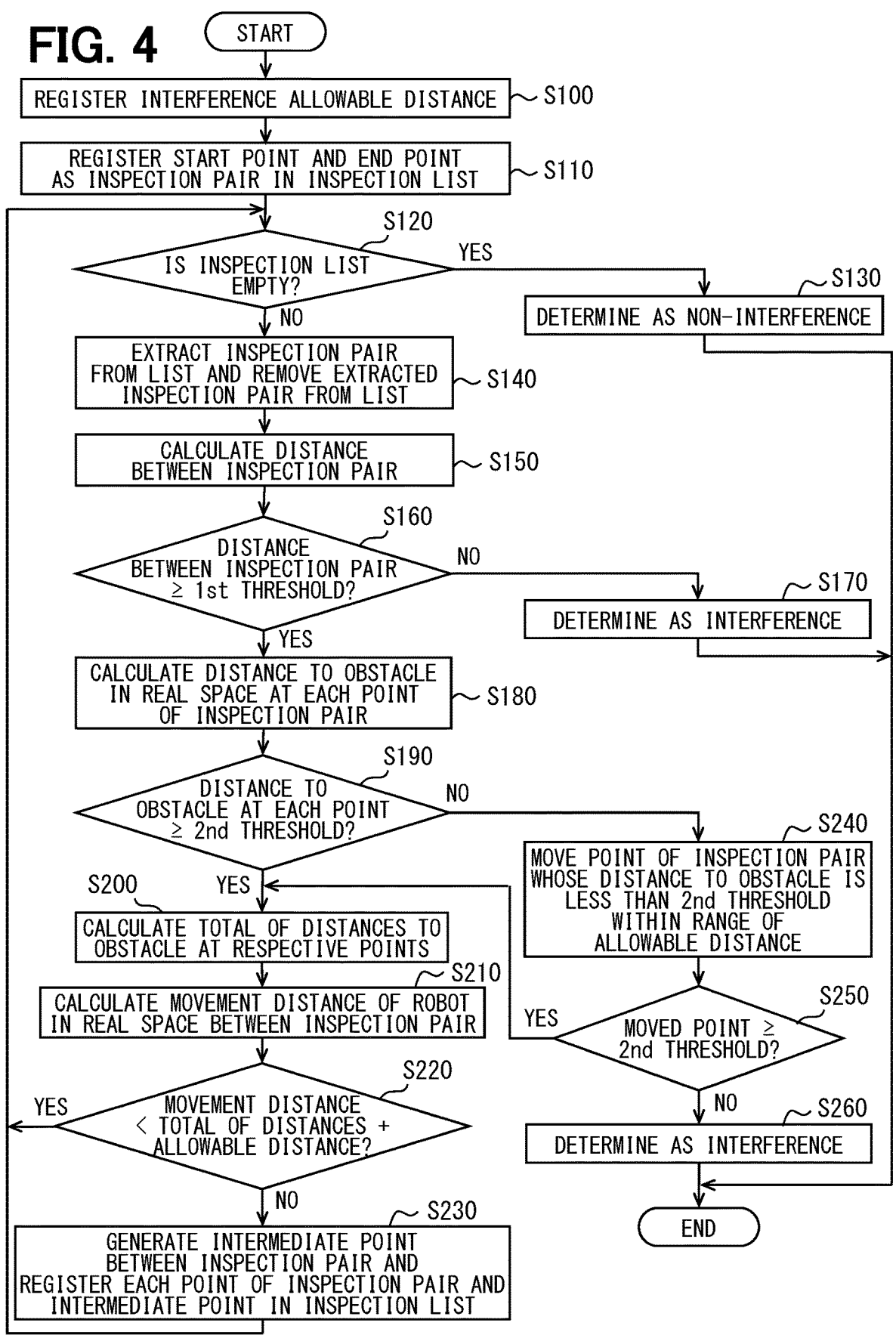
FIG. 4 is a flowchart including interference determination processing executed by the interference determination device according to the first embodiment.

The flowchart illustrated in FIG. 4 is started, for example, by a user's instruction. In S100 as a first step, an interference allowable distance in consideration of the characteristics of the obstacle 40 is registered in the interference determination device 100 by the user via the input device 110. The processing of S100 corresponds to the function of the interference determination condition registration unit 141.

In S110, the start point and the end point of the motion path of the robot 10 are registered as an inspection pair in an inspection list. The start point and the end point correspond to the posture of the robot 10 at each point. The posture of the robot 10 is determined by rotational positions of the movable portions such as the rotation angles of the joints 21 and 22. For example, when parameters representing the degrees of freedom of each shaft 11 and 12 of the robot 10 are considered as the rotation angles of each joint 21 and 22, the posture of the robot 10 can be represented as the coordinates of one point in a so-called configuration space with the rotation angles of each joint 21 and 22 as coordinate axes. The start point and the end point may be input by the user via the input device 110, or the start point and the end point may be read out from all or a part of the motion path generated in advance. The processing of S110 corresponds to the function of the start/end point registration unit 142.

In S120, it is determined whether the inspection list is empty. When the inspection list is empty, it means that the motion path along which the robot 10 moves from the start point to the end point has not been determined to interfere with the obstacle 40 by the processing of S140 to S260, which will be described later. Therefore, when it is determined that the inspection list is empty, the processing proceeds to S130, and the motion path between the start point and the end point is determined to be non-interference with the obstacle 40. The interference determination result output unit 144 outputs the determination result to the display device 120. On the other hand, when it is determined that the inspection list is not empty in S120, the processing proceeds to S140.

In S140, the inspection pair is extracted from the inspection list, and the extracted inspection pair is removed from the inspection list. In S150, a distance between the inspection pair is calculated in the configuration space. In S160, it is determined whether the calculated distance between the inspection pair is greater than or equal to a first threshold. When the calculated distance between the inspection pair is less than the first threshold, the processing proceeds to S170 to determine that the motion path between the inspection pair interferes with the obstacle 40. The interference determination result output unit 144 outputs the determination result to the display device 120. On the other hand, when the calculated distance between the inspection pair is greater than or equal to the first threshold, the processing proceeds to S180.

S160 described above is provided, in a case where an intermediate point is determined between the inspection pair in S230, which will be described later, in order to end the interference determination at a time point where the distance between the intermediate point and each point of the inspection pair becomes less than the first threshold. That is, without S160, the generation of the intermediate point in S230 may be repeated multiple times, and the loop from S360 to S120 may be executed permanently. It can be said that the first threshold in S160 determines the minimum distance in the configuration space for continuing the interference determination. When the distance between the inspection pair in the configuration space becomes less than the minimum distance, the interference determination of the motion path between the inspection pair is ended.

In S180, a distance to the obstacle at each point of the inspection pair is calculated in the real space, not in the configuration space. In this situation, the distance to the obstacle is calculated as the shortest distance between the robot 10 and the obstacle 40 in the posture of the robot 10 at each point of the inspection pair. In S190, it is determined whether the distance between the robot 10 and the obstacle 40 is secured to be greater than or equal to the second threshold at each point of the inspection pair. When the distance between the robot 10 and the obstacle 40 is not secured to be greater than or equal to the second threshold at one or both of the points of the inspection pair, it is considered that the robot 10 may interfere with the obstacle 40 at the point of the inspection pair where the distance between the robot 10 and the obstacle 40 is less than the second threshold. That is, the second threshold is a threshold for determining whether the distance between the robot 10 and the obstacle 40 in the real space is short enough to cause the interference between the robot 10 and the obstacle 40.

When it is determined that the distance between the robot 10 and the obstacle 40 is less than the second threshold for at least one of the points of the inspection pair, the processing proceeds to S240. On the other hand, when the distance between the robot 10 and the obstacle 40 is secured to be greater than or equal to the second threshold at each point of the inspection pair, it can be considered that the robot 10 does not interfere with the obstacle 40 at each point of the inspection pair. In this case, the processing proceeds to S200.

In S200, the total of the distances between the robot 10 and the obstacle 40 in the real space at the respective points of the inspection pair is calculated. In S210, when the robot 10 moves along the motion path between the inspection pair, the movement distance of the robot 10 in the real space is calculated. In this situation, the movement distance of the robot 10 is calculated as a movement distance (that is, the maximum movement distance) of a movement portion of the robot 10 that moves the longest while the posture of the robot 10 changes from the posture of the robot 10 at the start point of the inspection pair to the posture of the robot 10 at the end point of the inspection pair.

In S220, it is determined whether the movement distance calculated in S210 is smaller than the total value obtained by adding the interference allowable distance registered in the interference determination condition registration unit 141 to the total of the distances calculated in S200.

Figure 5A:
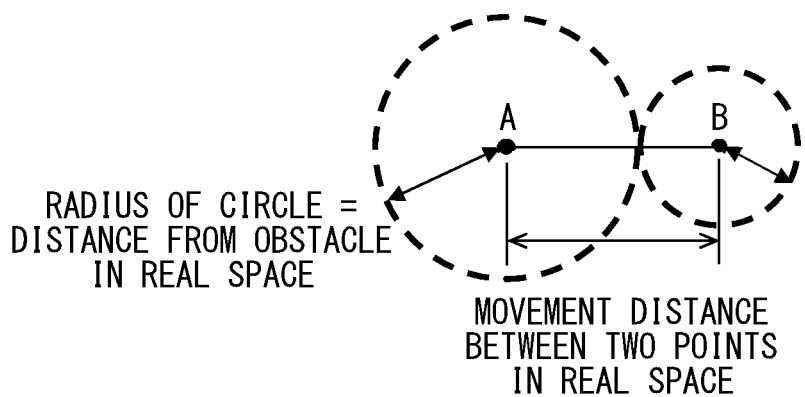
FIGS. 5A to 5C are explanatory diagrams for explaining the processing according to the flowchart of FIG. 4.
Figure 5B:
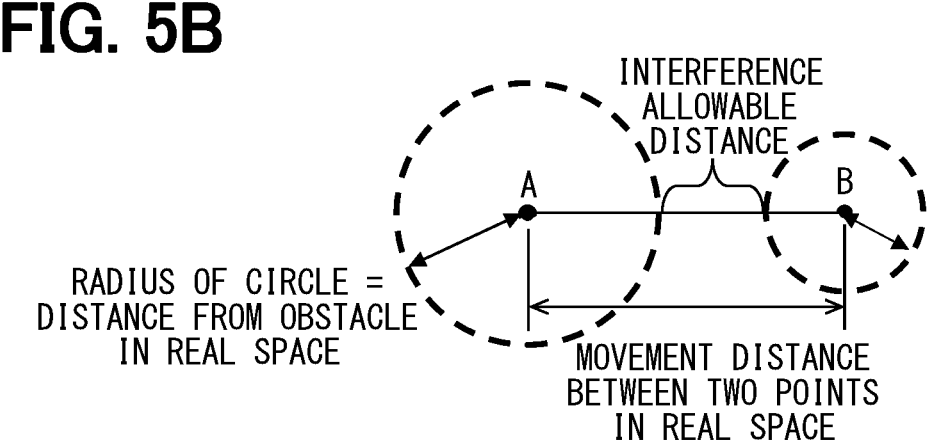
Figure 5C:
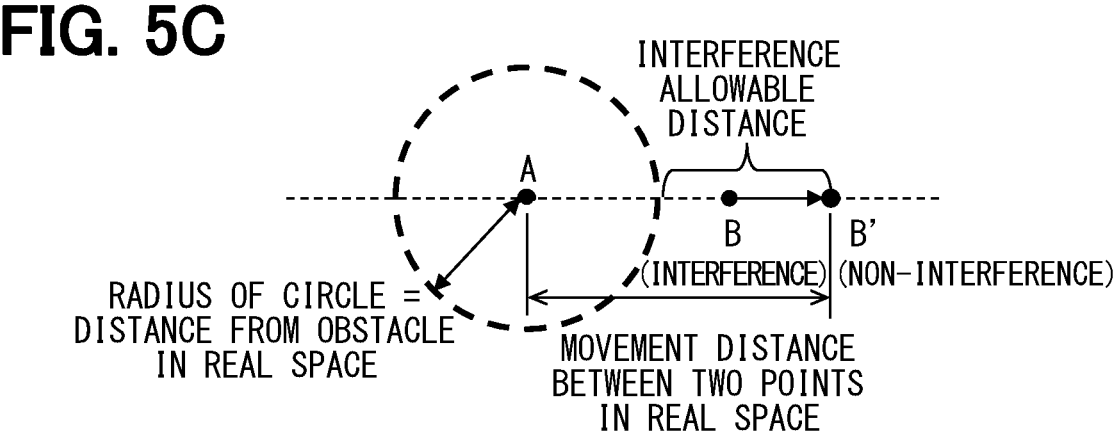

Here, the interference allowable distance will be explained with reference to FIGS. 5A to 5C. In FIGS. 5A to 5C, point A indicating the start point of the inspection pair and point B indicating the end point are illustrated. The point A and the point B are coordinate points in the configuration space. In FIGS. 5A to 5C, a circle whose radius is the distance between the robot 10 and the obstacle 40 in the real space is illustrated by a dotted line around the coordinate points (the point A and the point B) in the configuration space. Further, in FIGS. 5A to 5C, when the robot 10 moves from the point A to the point B (changes the posture), a distance (the maximum movement distance) that the robot 10 moves in the real space is illustrated by a solid line.

As illustrated in FIG. 5A, when the movement distance of the robot 10 calculated in S210 is smaller than the total of the distances between the robot 10 and the obstacle 40 at point A and the point B of the inspection pair calculated in S200, it can be said that the robot 10 does not interfere with (come into contact with) the obstacle 40 while moving from the point A to the point B (changing the posture).

However, when the interference between the robot 10 and the obstacle 40 is determined under the condition illustrated in FIG. 5A, only the motion path that the robot 10 reliably avoids the obstacle 40 can be determined as a non-interference motion path. In other words, for example, even when the obstacle 40 is flexible and there is no problem even if the robot 10 interferes with the obstacle 40 to some extent, the motion path of the robot 10 that allows some interference with the obstacle 40 cannot be determined as a non-interference motion path. Therefore, a motion path may be set for the robot 10 to avoid the obstacle 40 unnecessarily and significantly.

In the interference determination device 100 according to the present embodiment, it is configured to register the interference allowable distance in the interference determination device 100 (the interference determination condition registration unit 141), and is configured to determine whether the path of the robot 10 between the inspection pair interferes with the obstacle 40 by the interference determination unit 143 in consideration of the registered interference allowable distance. Specifically, as described above, in S220 of the flowchart of FIG. 4, it is configured to determine whether the movement distance calculated in S210 is smaller than the total value obtained by adding the interference allowable distance registered in the interference determination condition registration unit 141 to the total of the distances calculated in S200.

The determination condition will be explained with reference to FIG. 5B. As illustrated in FIG. 5B, when the movement distance of the robot 10 in the real space between the point A and the point B is greater than the total of the distance between the robot 10 and the obstacle 40 at the point A and the distance between the robot 10 and the obstacle 40 at the point B, the robot 10 may interfere with the obstacle 40 in the space between the circle around the point A and the circle around the point B illustrated in FIG. 5B. The above determination condition is to determine whether the distance between the circle around the point A and the circle around the point B is less than the interference allowable distance, as illustrated in FIG. 5B. When the distance between the circle around the point A and the circle around the point B is less than the interference allowable distance, the interference determination device 100 of the present disclosure considers that interference with the obstacle 40 does not occur when the robot 10 moves along the motion path between the point A and the point B, regardless of whether the robot 10 and the obstacle 40 actually interfere with each other. It can be said that the interference allowable distance indicates the upper limit of the movement distance of the robot 10 after the robot 10 comes into contact with the obstacle. The user inputs any value of the interference allowable distance and registers the value in the interference determination device 100, so that the motion path of the robot 10 that allows interference with the obstacle 40 at a distance less than the interference allowable distance is determined as the motion path that does not interfere with the obstacle 40.

In S220, when it is determined that the movement distance calculated in S210 is smaller than the total value obtained by adding the interference allowable distance registered in the interference determination condition registration unit 141 to the total of the distances calculated in S200, the processing returns to S120. On the other hand, when it is determined that the movement distance calculated in S210 is greater than or equal to the total value obtained by adding the interference allowable distance registered in the interference determination condition registration unit 141 to the total of the distances calculated in S200, the processing proceeds to S230.

When it is determined that the movement distance calculated in S210 is greater than or equal to the total value obtained by adding the interference allowable distance registered in the interference determination condition registration unit 141 to the total of the distances calculated in S200, even considering the interference allowable distance, the distance between the inspection pair in the real space is too long to determine the interference between the robot 10 and the obstacle 40, and the presence or absence of the interference between the robot 10 and the obstacle 40 cannot be appropriately determined. Therefore, in S230, the intermediate point is generated between the inspection pair in the configuration space, and each point of the inspection pair and the intermediate point are registered in the inspection list.

As a result, one point of the inspection pair and the intermediate point become a new inspection pair. In this way, the distance between the inspection pair is reduced to a distance at which interference between the robot 10 and the obstacle 40 can be determined. When the distance between the new inspection pair is still too long to determine the interference, a further intermediate point is determined between the new inspection pair. When one or more intermediate points are determined in this way, the start point, the end point, and the generated intermediate points are all passing points through which the motion path of the robot 10 passes. With respect to all passing points from the start point to the end point, in S220 described above, when a condition that the movement distance between adjacent inspection pairs is smaller than the total value obtained by adding the interference allowable distance to the total of the distances between the robot 10 and the obstacle 40 at the respective points of the inspection pair is satisfied, the processing proceeds from S120 to S130. Then, in S130, it is determined that the interference between the robot 10 and the obstacle 40 does not occur on the motion path between the start point and the end point.

In S240, which is executed when it is determined that the distance between the robot 10 and the obstacle 40 is less than the second threshold in at least one of the points of the inspection pair in S190, the point of the inspection pair at which the distance to the obstacle 40 is less than the second threshold is moved within a range of the interference allowable distance. For example, as illustrated in FIG. 5C, when it is determined that the distance between the robot 10 and the obstacle 40 is less than the second threshold at the point B, the point B is moved to a position (point B') away from the circle around the point A by the interference allowable distance on the straight line connecting the point A and the point B. The movement may be performed so that the distance between the point A and the point B becomes longer, or may be performed so that the distance between the point A and the point B becomes shorter.

When the point of the inspection pair whose distance to the obstacle 40 is less than the second threshold is the start point or the end point, it is preferable to move the start point or the end point so that the distance between the points of the inspection pair increases. Accordingly, even if the robot 10 interferes with the obstacle 40 at the start point or the end point, it is possible to determine whether the interference is interference within the interference allowable distance by using the points after movement as the inspection pair. When the point of the inspection pair whose distance to the obstacle 40 is less than the second threshold is the intermediate point, it is preferable to register the point after movement in the inspection list, and determine the presence or absence of the interference with the point after movement as one of the new inspection pair.

In S250, it is determined whether the distance between the robot 10 and the obstacle 40 is greater than or equal to the second threshold at the moved point. When the distance between the robot 10 and the obstacle 40 is greater than or equal to the second threshold, the processing proceeds to S200. In this case, the above processing for determining the presence or absence of interference from S200 to S220 is performed for the inspection pair including the point after movement. On the other hand, when the distance between the robot 10 and the obstacle 40 is less than the second threshold even at the moved point of movement, the processing proceeds to S260, and it is determined that the interference between the robot 10 and the obstacle 40 occurs in the path between the inspection pair. The interference determination result output unit 144 outputs the determination result to the display device 120. The determination in S250 may be executed for movement points within a range of the interference allowable distance until the distance between the robot 10 and the obstacle 40 becomes greater than or equal to the second threshold. In this case, when the distance between the robot 10 and the obstacle 40 is less than the second threshold at any of the movement points, it may be determined that the interference between the robot 10 and the obstacle 40 occurs in the motion path between the inspection pair.

The processing of S120 to S250 excluding S130 and S170 corresponds to the function of the interference determination unit 143. The processing of S130, S170, and S260 corresponds to the function of the interference determination result output unit 144.

Second Embodiment

Next, in the first embodiment, a case where a positional error that may be included in a relative position is registered in the interference determination device 100 as an interference determination condition when the relative position between the robot 10 and the obstacle 40 is grasped will be explained.

In a robot control system illustrated in FIG. 2, the robot control device 60 grasps the posture of the robot 10 and the position of the obstacle 40 based on the image signal from the camera 50 that images the robot 10 and the obstacle 40. In this situation, the coordinate transformation positional error (calibration error) may occur when the coordinate transformation is performed between a coordinate position in the measurement coordinate system when the positions of the robot 10 and the obstacle 40 are measured by the camera 50 and a coordinate position in the control coordinate system when the robot control device 60 controls the position of the robot 10. When the robot control device 60 controls the robot 10 to the target position on the path, the control positional error corresponding to deviation from the target position may occur. Due to these positional errors and the like, a positional error is included in the relative position between the robot 10 and the obstacle 40. In addition, in the relative position between the robot 10 and the obstacle 40, a positional error based on the mounting error of the camera 50, a positional error based on the recognition accuracy of the camera 50, and when the shape of the shafts 11 and 12 of the robot 10 is not perfect circle and when the shafts 11 and 12 of the robot 10 rotate as the posture of the robot 10 changes, a positional error caused by the rotation may also be included.

The user is capable of obtaining the above-described various positional errors by calculation or statistical processing in the actual machine or simulator (robot control model). The user is capable of registering the obtained various positional errors as clearance amounts in the interference determination device 100 (interference determination condition registration unit 141) via the input device 110. The positional error may be determined by the robot control device 60 or the like and may be registered in the interference determination device 100.

Processing executed in the interference determination device 100 when the positional error (clearance amount) is registered in the interference determination device 100 will be explained with reference to the flowchart of FIG. 6. In the first S300, the user registers the positional error (clearance amount) in the interference determination device 100 via the input device 110. Since the processing from S310 to S410 and the processing of S430 are the same as the processing from S110 to S210 and the processing of S230 of the flowchart of FIG. 4, the explanation thereof is omitted.

In S420, it is determined whether the movement distance calculated in S410 is smaller than a value obtained by subtracting the positional error (clearance amount) registered in the interference determination condition registration unit 141 from the total of the distances calculated in S400. The determination condition will be explained with reference to FIG. 7.

As explained with reference to FIG. 5A, when the movement distance of the robot 10 is smaller than the total of the distances between the robot 10 and the obstacle 40 at the point A and the point B of the inspection pair, the robot 10, the robot 10 does not interfere with (come into contact with) the obstacle 40 while the robot 10 moves (changes the posture) from the point A to the point B. However, when grasping the relative position of the robot 10 and the obstacle 40 due to various factors as described above, when the positional error is included in the relative position, the robot 10 may interfere with the obstacle 40 due to the positional error even when the condition illustrated in FIG. 5A is satisfied.

In the present embodiment, when grasping the relative position of the robot 10 and the obstacle 40, even if the positional error is included in the relative position, it is configured so that the presence or absence of interference between the robot 10 and the obstacle 40 can be reliably determined in the motion path of the inspection pair. Therefore, in the present embodiment, in S420, the presence or absence of the interference is determined by whether the movement distance of the robot 10 is smaller than a value obtained by subtracting the registered positional error (clearance amount) from the total of the distances between the robot 10 and the obstacle 40 at the point A and the point B of the inspection pair.

Figure 7:
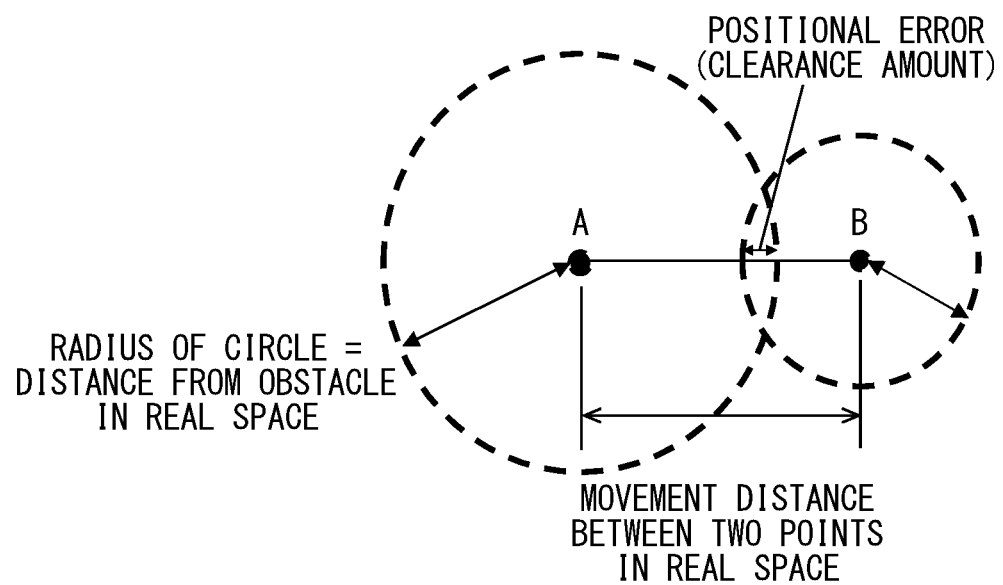
FIG. 7 is an explanatory diagram for explaining the processing according to the flowchart of FIG. 6.

The determination condition means, as illustrated in FIG. 7, determining that the robot 10 does not interfere with the obstacle 40 in the motion path between the point A and the point B, when the movement distance between the point A and the point B in the real space is such that a circle around the point A whose radius is the distance between the robot 10 and the obstacle 40 at the point A overlaps a circle around the point B whose the radius is the distance between the robot 10 and the obstacle 40 at the point B by the positional error (clearance amount) or more. Accordingly, when grasping the relative position of the robot 10 and the obstacle 40, even if the positional error is included in the relative position, it is possible to reliably determine the presence or absence of interference between the robot 10 and the obstacle 40 in the motion path between the inspection pair.

Figure 6:
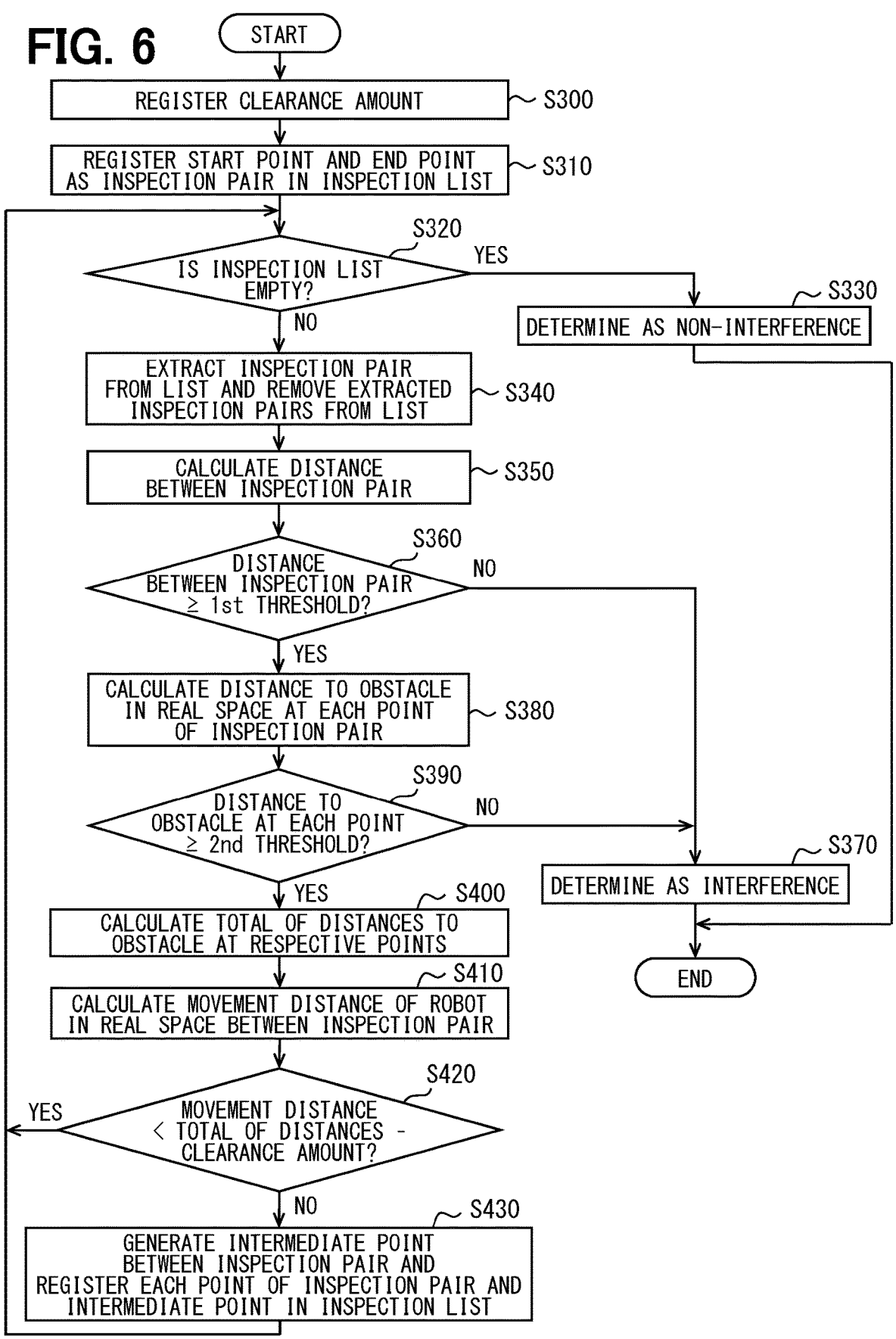
FIG. 6 is a flowchart including interference determination processing executed by an interference determination device according to a second embodiment.

As described above, by executing the processing illustrated in the flowchart of FIG. 6, it becomes possible to more appropriately determine the presence or absence of interference with the obstacle 40 in consideration of the positional error.

Third Embodiment

Next, a case where the synchronization time error when the obstacle 40 is a movable object that moves along the predetermined path in synchronization with the motion of the robot 10 is registered in the interference determination device 100 as the interference determination condition in the first embodiment will be explained.

For example, when the multiple robots 10 are arranged close to each other and the multiple robots 10 work together to perform the predetermined work, the first robot 10 may become the obstacle 40 for the second robot 10. Conversely, it can also be said that the second robot 10 may be the obstacle 40 for the second robot 10.

In this case, the first robot 10 and the second robot 10 are controlled to move along their respective motion paths in synchronization with a predetermined cycle in order to work together to perform the predetermined work. However, since the synchronization between the first robot 10 and the second robot 10 is performed at a predetermined cycle, the positions on the motion path may deviate by the cycle at maximum.

Therefore, in the present embodiment, it is possible to register the synchronization time error when the obstacle 40 is a movable object that moves along the predetermined path in synchronization with the motion of the robot 10, in the interference determination device 100 (interference determination condition registration unit 141). It is possible to register the synchronization time error in the interference determination device 100 as a time length representing the synchronization time error, a distance corresponding to the synchronization time error, or a ratio to the synchronization time cycle in which synchronization is performed.

Processing executed in the interference determination device 100 when the synchronization time error is registered in the interference determination device 100 will be explained with reference to the flowchart of FIG. 8. In the first S500, the user registers the time synchronization error in the interference determination device 100 via the input device 110. However, the time synchronization error may be registered by the robot control device 60 that controls the postures of the first and second robots 10. Since the processing from S510 to S590, and the processing of S620 and the processing of S640 are the same as the processing from S110 to S190 in the flowchart of FIG. 4, and the processing of S610 and the processing of S230, the explanation thereof is omitted.

In S600, the maximum movement distance of the dynamic obstacle 40 due to the synchronization time error is calculated. That is, the longest distance is calculated among the movement distances in which each part of the dynamic obstacle 40 moves in the time corresponding to the synchronization time error. In S610, the total of the distances between the robot 10 and the dynamic obstacle 40 at the respective points of the inspection pair is calculated in consideration of the maximum movement distance of the dynamic obstacle 40 due to the synchronization time error. The processing of S610 will be explained in more detail with reference to FIG. 9.

Figure 9:
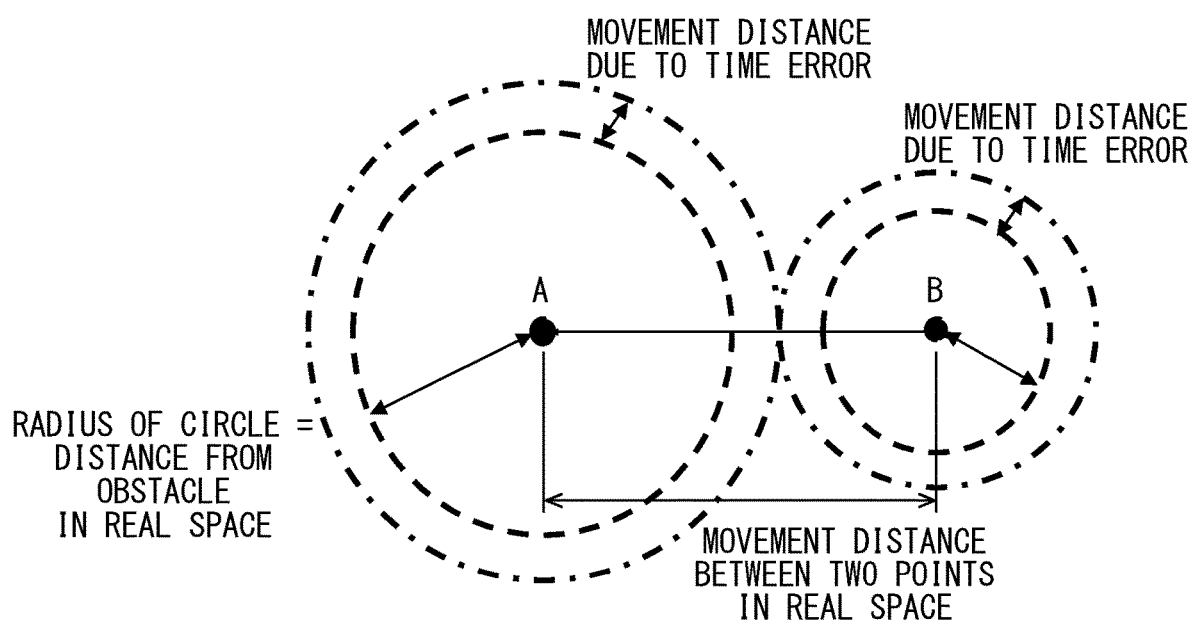
FIG. 9 is an explanatory diagram for explaining the processing according to the flowchart of FIG. 8.

When each point of the inspection pair is defined as the point A and the point B, the distance between the robot 10 and the dynamic obstacle 40 at the point A and the distance between the robot 10 and the dynamic obstacle 40 at the point B in the real space are calculated. However, the position of the dynamic obstacle 40 may deviate by a time error as described above. Therefore, as illustrated in FIG. 9, the distance between the robot 10 and the dynamic obstacle 40 at the point A indicated by the circle of the dotted line is added to the maximum movement distance of the dynamic obstacle 40 due to the time error to obtain a distance to the dynamic obstacle 40 at the point A indicated by the circle of the one-dot chain line. Similarly, the distance between the robot 10 and the dynamic obstacle 40 at the point B indicated by the circle of the dotted line is added to the maximum movement distance of the dynamic obstacle 40 due to the time error to obtain a distance to the dynamic obstacle 40 at the point B indicated by the circle of the one-dot chain line. By totaling the obtained distances to the dynamic obstacle 40 at the point A and the point B of the inspection pair, the total of the distances between the robot 10 and the dynamic obstacle 40 at the point A and the point B of the inspection pair is obtained.

In S630, it is determined whether the movement distance calculated in S620 is smaller than the total of the distances calculated in S610. When it is determined that the movement distance calculated in S620 is smaller than the total of the distances calculated in S610, the processing returns to S520. When it is determined that the movement distance calculated in S620 is smaller than the total of the distances calculated in S610 for all paths from the start point to the end point, the path is determined to be non-interference with the dynamic obstacle 40 in S530 when the processing proceeds to S530 via S520. On the other hand, when it is determined that the movement distance calculated in S620 is greater than or equal to the total of the distances calculated in S610, the processing proceeds to S640.

Figure 8:
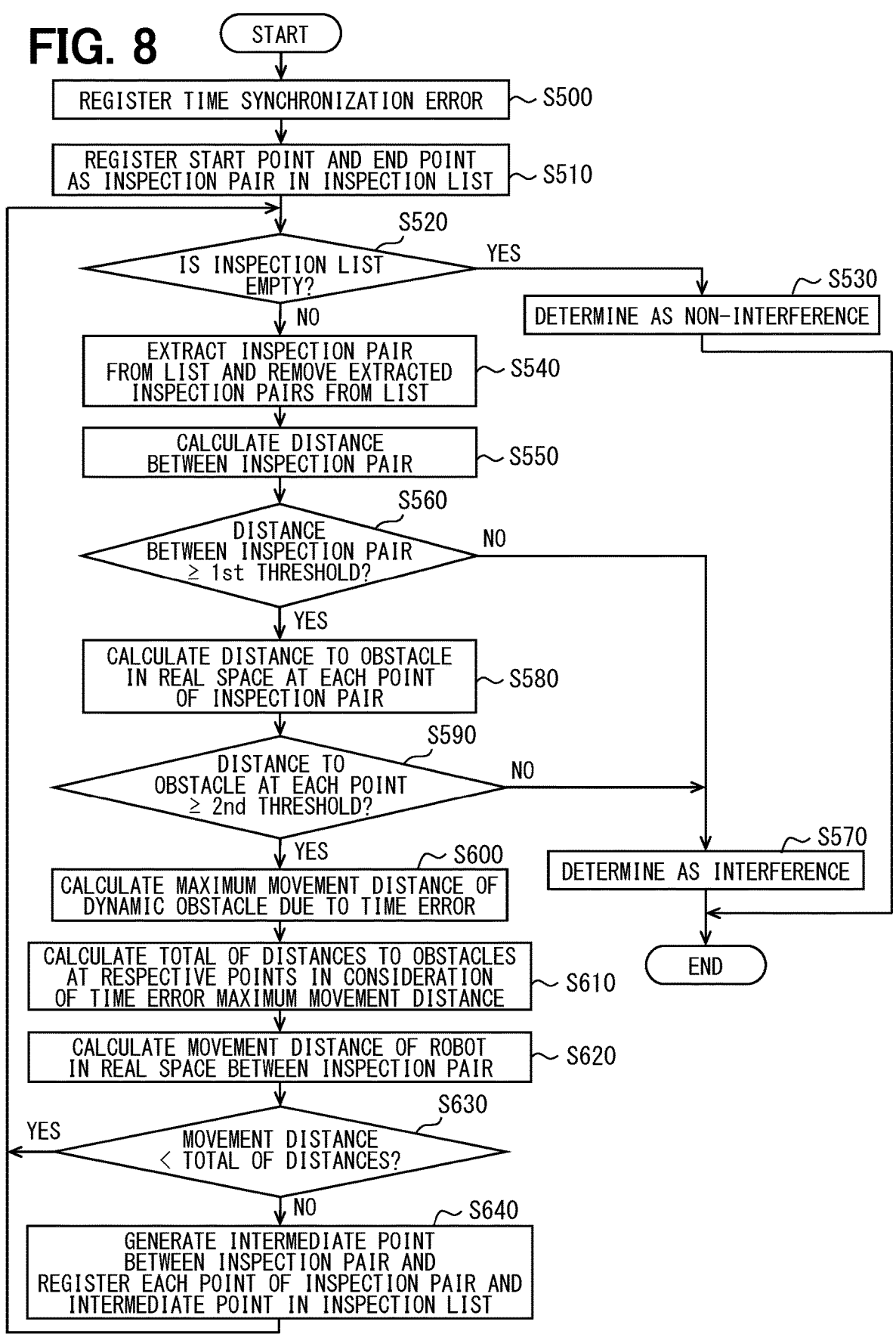
FIG. 8 is a flowchart including interference determination processing executed by an interference determination device according to a third embodiment.

As described above, by executing the processing illustrated in the flowchart of FIG. 8, it becomes possible to more appropriately determine the presence or absence of interference with the obstacle 40 in consideration of the time synchronization error.

Fourth Embodiment

According to the third embodiment, it is possible to reliably determine whether the motion path of the robot 10 interferes with the dynamic obstacle 40 even if there is a positional deviation of the dynamic obstacle 40 due to the synchronization time error by calculating the total of the distances between the robot 10 and the dynamic obstacle 40 at the respective points of the inspection pair in consideration of the maximum movement distance of the dynamic obstacle 40 due to the synchronization time error.

On the other hand, the condition for determining non-interference in the third embodiment may include determining the motion path of the robot 10 as non-interference, such as a case where the excessive space exists between the robot 10 and the dynamic obstacle 40. In other words, the condition for determining non-interference in the third embodiment has a possibility of determining interference with the dynamic obstacle 40 in the motion path of the robot 10, even though the robot 10 and the dynamic obstacle 40 do not actually interfere with each other.

In the fourth embodiment, the interference determination method that is capable of more precisely determining whether interference with the dynamic obstacle 40 occurs in the motion path of the robot 10 will be explained. The interference determination method of the fourth embodiment explained below may be performed when non-interference is not determined in the interference determination method of the third embodiment, or may be performed instead of the interference determination method of the third embodiment.

Figure 10:
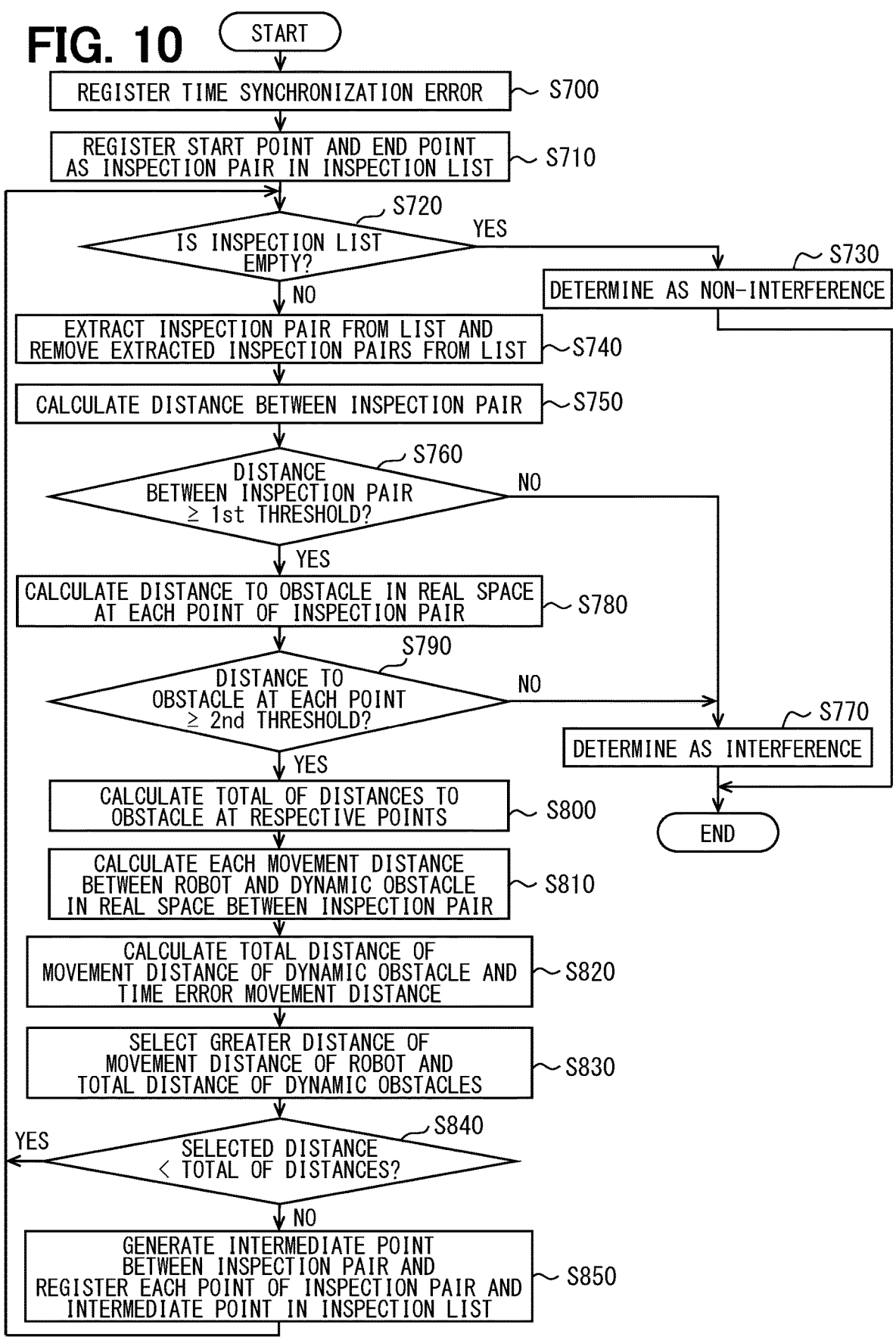
FIG. 10 is a flowchart including interference determination processing executed by an interference determination device according to a fourth embodiment.

The flowchart of FIG. 10 illustrates the interference determination method of the fourth embodiment. Since the processing from S700 to S790 and the processing of S850 of the flowchart of FIG. 10 are the same as the processing from S500 to S590 and the processing of S640 of the flowchart of FIG. 8 illustrating the interference determination method of the third embodiment, the explanation thereof is omitted.

In S800 of the flowchart of FIG. 10, the total of the distances between the robot 10 and the dynamic obstacle 40 in the real space at the respective points of the inspection pair is calculated. In S810, the movement distance (maximum movement distance) of the robot 10 in the real space when the robot 10 moves along the motion path between the inspection pair is calculated. Similarly, the movement distance (maximum movement distance) of the dynamic obstacle 40 in the real space when the dynamic obstacle 40 moves between a pair of passing points of the dynamic obstacle 40 corresponding to the inspection pair is calculated.

In S820, a total distance obtained by totaling the movement distance of the dynamic obstacle 40 calculated in S810 and the maximum movement distance of the dynamic obstacle 40 due to the synchronization time error is calculated. In S830, the movement distance of the robot 10 calculated in S810 is compared with the total distance of the movement distance of the dynamic obstacle 40 calculated in S820 and the maximum movement distance due to the synchronization time error, and the greater distance is selected. In S840, it is determined whether the distance selected in S830 is smaller than the total of the distances calculated in S800.

Figure 11:
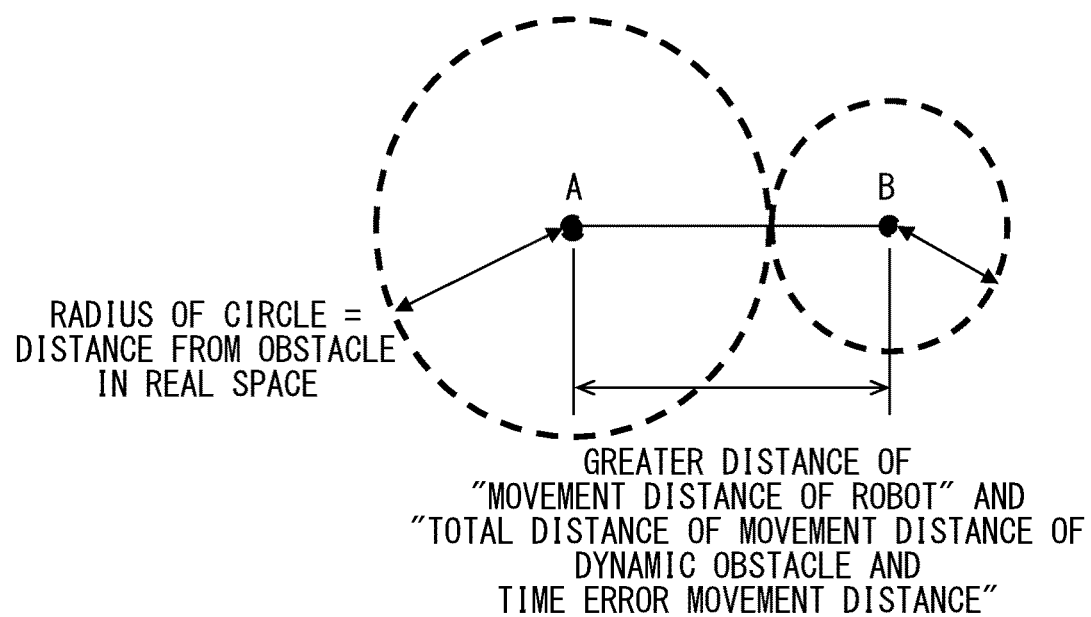
FIG. 11 is an explanatory diagram for explaining the processing according to the flowchart of FIG. 10.

Here, the above determination condition will be explained with reference to FIG. 11. As illustrated in FIG. 11, as the distance between the point A and the point B, which are the inspection pair, the greater distance of the movement distance of the robot 10 and the total distance of the movement distance of the dynamic obstacle 40 calculated in S820 and the maximum movement distance due to the synchronization time error is used. When the selected greater distance is smaller than the total of the distance to the dynamic obstacle 40 at the point A and the distance to the dynamic obstacle 40 at the point B, it can be said that the robot 10 does not interfere with (come into contact with) the dynamic obstacle 40 while the robot 10 moves (changes the posture) from the point A to the point B even if the positional deviation of the dynamic obstacle 40 due to the synchronization time error occurs.

As described above, according to the interference determination method of the fourth embodiment, it is possible to more precisely determine whether interference with the dynamic obstacle 40 occurs in the motion path of the robot 10.

Although the exemplarily embodiments of the present disclosure have been explained above, the present disclosure is not limited to the above-described embodiments, and can be implemented by various modifications without departing from the spirit of the present disclosure.

For example, in each of the above-described embodiments, the interference determination device 100 that determines whether the motion path of the robot 10 passing through from the start point to the end point interferes with the obstacle (or dynamic obstacle) 40 has been explained. However, as illustrated in FIG. 12, a path generation device 200 including the interference determination device 100 including the interference determination condition registration unit 141, the start/end point registration unit 142, and the interference determination unit 143, and a path generation unit 145 that generates a motion path along which the robot 10 is capable of moving without interfering with the obstacle 40, based on the interference determination result by the interference determination device 100 may be configured.

Figure 12:
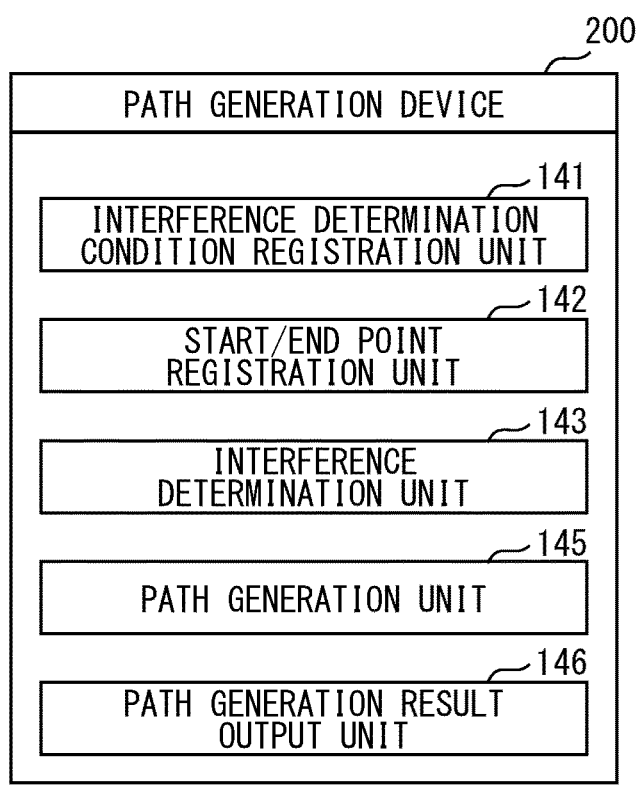
FIG. 12 is a block diagram illustrating functions of a path generation device according to a modification.

The path generation unit 145 illustrated in FIG. 12 generates the motion path from the start point to the end point, and when the interference determination device 100 determines that the generated motion path interferes with the obstacle 40, a new motion path is generated based on the determination result. By repeating motion path generation and interference determination in this way, the path generation device 200 is capable of generating a motion path along which the robot 10 is capable of moving without interfering with the obstacle 40. The generated motion path is displayed on, for example, the display device 120 by a path generation result output unit 146.

In addition, in each of the above-described embodiments, as interference determination conditions, the examples of determining interference with the obstacle 40 have been explained in consideration of at least one of the interference allowable distance that allows the interference with the obstacle 40, the positional error that may be included in the relative position when grasping the relative position between the robot 10 and the obstacle 40, and the synchronization time error when the obstacle 40 is a movable object that moves along the predetermined path in synchronization with the motion of the robot 10. However, the interference determination device 100 is capable of registering any combination of two or more interference determination conditions in the interference determination condition registration unit 141 for the same obstacle 40 among interference determination conditions of the interference allowable distance, the positional error, and the synchronization time error. When interference determination conditions are registered, the interference determination methods explained in each embodiment can be executed in parallel or sequentially, or two or more interference determination conditions can be combined into one condition to determine interference with the obstacle 40. In addition, when the obstacles 40 exist around the robot 10, one or more interference determination conditions can be registered for each obstacle 40.

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. An interference determination device to determine whether a motion of a robot interferes with an obstacle, the interference determination device comprising:
    a processor;
    a non-transitory computer-readable storage medium; and
    a set of computer-executable instructions stored on the non-transitory computer-readable storage medium that cause the processor to:
    register a start point and an end point of the motion of the robot;
    determine whether the robot interferes with the obstacle, when the robot moves along a path from the start point to the end point; and
    register an interference determination condition for determining the interference of the robot with the obstacle, wherein
    the set of computer-executable instructions further cause the processor to
    register, as the interference determination condition, at least one of an interference allowable distance that allows the interference with the obstacle, a positional error that is included in a relative position between the robot and the obstacle when the relative position is grasped, and a synchronization time error when the obstacle is a movable object that moves along a predetermined path in synchronization with the motion of the robot, wherein the interference allowable distance indicates an upper limit of a movement distance of the robot after the robot comes into contact with the obstacle; and
    determine the interference of the robot with the obstacle in consideration of the interference determination condition that is registered, wherein the robot and the obstacle are not considered to have interfered when the robot moves within the interference allowable distance after the robot comes into contact with the obstacle;
    generate a path to move the robot without interfering with the obstacle, based on an interference determination result; and
    control the robot to follow the path.

2. The interference determination device according to claim 1,
    the interference allowable distance is the interference determination condition, and
    when, with respect to passing points, which include the start point and the end point, on the path from the start point to the end point, a condition that a movement distance of the robot between two adjacent passing points is smaller than a value obtained by adding the interference allowable distance to a total of distances to the obstacle at the respective passing points is satisfied at all the passing points from the start point to the end point, the set of computer-executable instructions further cause the processor to determine non-interference with the obstacle with respect to the path passing through the passing points between the start point and the end point.

3. The interference determination device according to claim 2, wherein
    the set of computer-executable instructions further cause the processor to sets a new passing point between the two adjacent passing points when the movement distance of the robot between the two adjacent passing points is greater than the value obtained by adding the interference allowable distance to the total of distances to the obstacle the respective passing points, and determines whether the condition is satisfied by using the new passing point and one passing point of the two adjacent passing points as new two adjacent passing points.

4. The interference determination device according to claim 2, wherein
    when the distance to the obstacle is less than a predetermined threshold at one or both of the two adjacent passing points, the passing point at which the distance to the obstacle is less than the threshold is moved within a range of the interference allowable distance, and
    when the distance to the obstacle is greater than or equal to the threshold at the passing point after movement and a movement distance of the robot between the two adjacent passing points including the passing point after movement is smaller than the value obtained by adding the interference allowable distance to the total of distances to the obstacle the respective passing points, the set of computer-executable instructions further cause the processor to determine the condition is satisfied.

5. The interference determination device according to claim 1, wherein
    the positional error includes at least one of (i) a coordinate transformation positional error when coordinate transformation is performed between a coordinate position in a measurement coordinate system when a position of the obstacle is measured and a coordinate position in a control coordinate system when a position of the robot is controlled, and (ii) a control positional error corresponding to a deviation from a target position on the path when the robot is controlled to the target position.

6. The interference determination device according to claim 5, wherein
the positional error is the interference determination condition, and
when, with respect to passing points, which include the start point and the end point, on the path from the start point to the end point, a condition that a movement distance of the robot between two adjacent passing points is smaller than a value obtained by subtracting a length corresponding to the positional error from a total of distances to the obstacle at the respective passing point is satisfied at all the passing points from the start point to the end point, the set of computer-executable instructions further cause the processor to determine non-interference with the obstacle with respect to the path passing through the passing points between the start point and the end point.

7. The interference determination device according to claim 1, wherein
the synchronization time error is registered as a time length representing the synchronization time error, a distance corresponding to the synchronization time error, or a ratio to a synchronization time cycle.

8. The interference determination device according to claim 7, wherein
movement positions of the robot and the obstacle are synchronized at a predetermined time cycle, and
the synchronization time error occurs within the predetermined time cycle.

9. The interference determination device according to claim 7, wherein
the interference determination condition registered is the synchronization time error, and
when, with respect to passing points, which include the start point and the end point, on the path from the start point to the end point, a condition that a movement distance of the robot between two adjacent passing points is smaller than a total of distances to the obstacle at the respective passing points in consideration of a maximum movement distance that the obstacle is capable of moving due to the synchronization time error is satisfied at all the passing points from the start point to the end point, the set of computer-executable instructions further cause the processor to determine non-interference with the obstacle with respect to the path passing through the passing points between the start point and the end point.

10. The interference determination device according to claim 7, wherein
the synchronization time error is the interference determination condition, and
when, with respect to passing points, which include the start point and the end point, on the path from the start point to the end point, a condition that a greater distance of a movement distance of the robot between two adjacent passing points and a total distance obtained by adding a maximum movement distance that the obstacle is capable of moving due to the synchronization time error to a movement distance of the obstacle between two positions of the obstacles corresponding to the two adjacent passing points is smaller than a total of distances between the robot and the obstacle at the respective passing points is satisfied at all the passing points from the start point to the end point, the set of computer-executable instructions further cause the processor to determine non-interference with the obstacle with respect to the path passing through the passing points between the start point and the end point.

11. The interference determination device according to claim 1, wherein
the set of computer-executable instructions further cause the processor to
register any combination of two or more of a plurality of the interference determination conditions including the interference allowable distance, the positional error, and the synchronization time error.

12. A path generation device comprising:
a processor;
a non-transitory computer-readable storage medium; and
a set of computer-executable instructions stored on the non-transitory computer-readable storage medium that cause the processor to:
register a start point and an end point of a motion of a robot;
register an interference determination condition for determining an interference of the robot with an obstacle when the robot moves along a path from a start point to an end point, the interference determination condition including at least one of an interference allowable distance that allows an interference with the obstacle, a positional error that is included in a relative position between the robot and the obstacle when the relative position is grasped, and a synchronization time error when the obstacle is a movable object that moves along a predetermined path in synchronization with the motion of the robot, wherein the interference allowable distance indicates an upper limit of a movement distance of the robot after the robot comes into contact with the obstacle; and
determine whether the robot interferes with the obstacle, when the robot moves along the path from the start point to the end point, in consideration of the interference determination condition that is registered, wherein the robot and the obstacle are not considered to have interfered when the robot moves within the interference allowable distance after the robot comes into contact with the obstacle;
generate a path to move the robot without interfering with the obstacle, based on an interference determination result; and
control the robot to follow the path.

13. An interference determination device comprising a processor and a memory configured to:
register a start point and an end point of a motion of a robot;
register an interference determination condition for determining an interference of the robot with an obstacle when the robot moves along a path from a start point to an end point, the interference determination condition including at least one of an interference allowable distance that allows the interference with the obstacle, a positional error that is included in a relative position between the robot and the obstacle when the relative position is grasped, and a synchronization time error when the obstacle is a movable object that moves along a predetermined path in synchronization with the motion of the robot, wherein the synchronization time error is registered as a time length representing the synchronization time error, a distance corresponding to the synchronization time error, or a ratio to a synchronization time cycle;

determine whether the robot interferes with the obstacle, when the robot moves along a path from the start point to the end point, in consideration of the registered interference determination conditions;

generate a path to move the robot without interfering with the obstacle, based on an interference determination result; and control the robot to follow the path.

14. The interference determination device according to claim 13, wherein the interference allowable distance indicates an upper limit of a movement distance of the robot after the robot comes into contact with the obstacle, and the processor and the memory are further configured to not consider that the robot and the obstacle have interfered when the robot moves within the interference allowable distance after the robot comes into contact with the obstacle.

\* \* \* \* \*